United States Patent
Liu

(10) Patent No.: US 9,749,332 B2
(45) Date of Patent: Aug. 29, 2017

(54) ELECTRONIC DEVICE WITH ADDICTION-PREVENTION FUNCTION AND METHOD THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Xin-Long Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 139 days.

(21) Appl. No.: 14/796,495

(22) Filed: Jul. 10, 2015

(65) Prior Publication Data
US 2016/0315942 A1     Oct. 27, 2016

(30) Foreign Application Priority Data
Apr. 21, 2015   (CN) .......................... 2015 1 0189895

(51) Int. Cl.
*H04L 29/06*     (2006.01)
*G06F 21/32*     (2013.01)

(52) U.S. Cl.
CPC ............ *H04L 63/102* (2013.01); *G06F 21/32* (2013.01); *H04L 63/083* (2013.01); *H04L 63/0861* (2013.01); *G06F 2221/2139* (2013.01)

(58) Field of Classification Search
CPC ... H04L 63/101; H04L 63/102; H04L 63/083; H04L 63/0861; H04W 4/02; G06F 21/32; G06F 2221/2139
USPC ........................................................ 726/4
See application file for complete search history.

(56) References Cited

U.S. PATENT DOCUMENTS

| | | | |
|---|---|---|---|
| 2012/0321144 A1* | 12/2012 | Choong ............ | G06K 9/00221 382/118 |
| 2013/0047229 A1* | 2/2013 | Hoefel .................. | G06F 21/629 726/7 |

* cited by examiner

*Primary Examiner* — Baotran N To
(74) *Attorney, Agent, or Firm* — Steven Reiss

(57) ABSTRACT

An addiction-prevention method, includes steps: generating a prompt signal to prompt a user to input a biological feature again every a first predetermined time after the user is logged in a particular application; judging whether the biological feature input by the user matches with a biological feature corresponding to an account that the user used to log in the particular application; and forbidding the user to use the particular application if the biological feature input by the user is not matched with the biological feature corresponding to the account.

13 Claims, 6 Drawing Sheets

ELECTRONIC DEVICE WITH ADDICTION-PREVENTION FUNCTION AND METHOD THEREOF

CROSS-REFERENCE TO RELATED APPLICATION

This application claims priority to Chinese Patent Application No. 201510189895.2 filed on Apr. 21, 2015, the contents of which are incorporated by reference herein.

FIELD

The subject matter herein generally relates to computer program security.

BACKGROUND

Nowadays, electronic devices, such as mobile phones, tablet computers, desktop computers, have installed many types of software, such as games, electronic books, and browsers. However, more and more young people may become addicted to playing games or other software.

BRIEF DESCRIPTION OF THE DRAWINGS

Implementations of the present technology will now be described, by way of example only, with reference to the attached figures.

DETAILED DESCRIPTION

Figure 1:
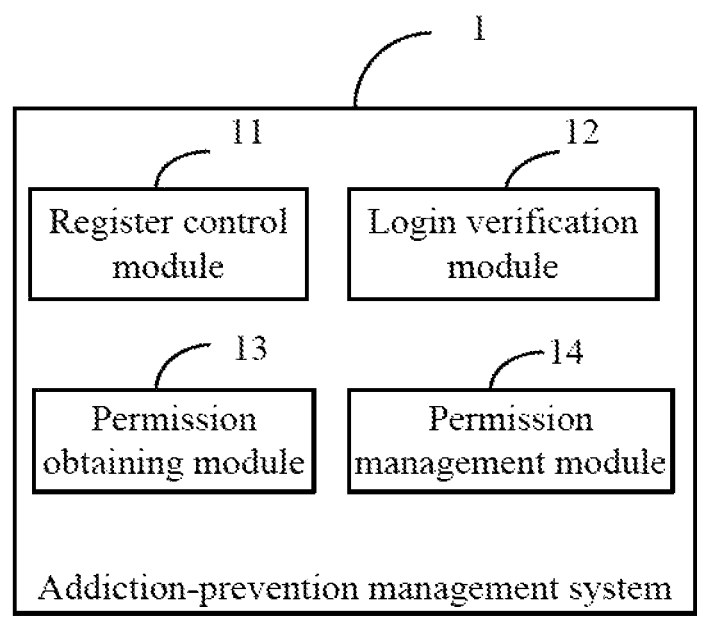
FIG. 1 is a block diagram of an anti-addiction management system of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like. The connection can be such that the objects are permanently connected or releasably connected.

Figure 2:
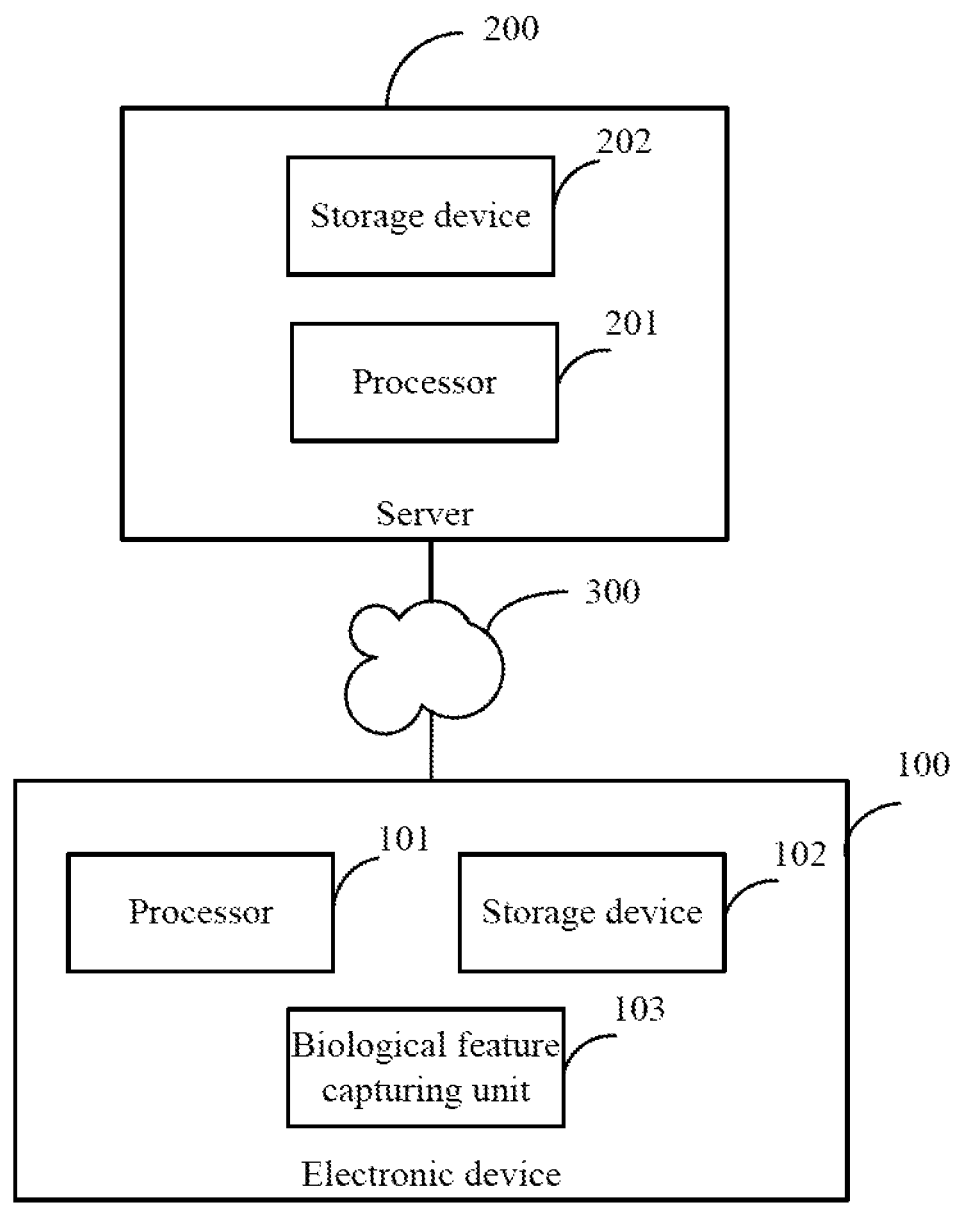
FIG. 2 is a block diagram of an electronic device with addiction-prevention function and a server connected to the electronic device, of one embodiment.

FIG. 1 illustrates an addiction-prevention management system 1, and FIG. 2 illustrates a running environment of the addiction-prevention management system 1. The running environment of the addiction-prevention management system 1 includes an electronic device 100 and a server 200. The electronic device 100 is connected to the server 200 via a network 300 by wires or in wireless mode. The addiction-prevention management system 1 is used to prevent a user of the electronic device 100 from constantly playing games, or using any software in a very frequent manner.

The electronic device 100 includes a processor 101, a storage device 102, and a biological feature capturing unit 103. The server 200 includes a processor 201 and a storage device 202.

The electronic device 100 can be a desktop computer, a portable computer, a tablet computer, or a mobile phone. A number of applications are installed in the electronic device 100. The server 200 can be a background server providing/supporting a particular application (also can be program or software), such as a network game, a video player software, or an electronic reader software. The network 300 can be the Internet, a wireless network including WIFI® and BLUETOOTH®, a telecommunication network including a general packet radio service (GPRS) network and a code division multiple access (CDMA) network, or a broadcasting network.

As shown in FIG. 1, the addiction-prevention management system 1 includes a register control module 11, a login verification module 12, a permission obtaining module 13, and a permission management module 14. In the embodiment, the modules of the addiction-prevention management system 1 can be collections of software instructions stored in the storage device 102 of the electronic device 100 and executed by the processor 101 of the electronic device 100. The modules of the addiction-prevention management system 1 also can include functionality represented as hardware or integrated circuits, or as software and hardware combinations, such as a special-purpose processor or a general-purpose processor with special-purpose firmware.

In at least one embodiment, each one of the processors 101, 201, can be a central processing unit, a digital signal processor, or a single chip, for example. In at least one embodiment, each one of the storage devices 102, 202 can be an internal storage system, such as a flash memory, a random access memory (RAM) for temporary storage of information, and/or a read-only memory (ROM) for permanent storage of information. Each one of the storage devices 102, 202 can also be a storage system, such as a hard disk, a storage card, or a data storage medium. Each one of the storage devices 102, 202 can include volatile and/or non-volatile storage devices. In at least one embodiment, each one of the storage devices 102, 202 can include two or more storage devices such that one storage device is a memory and the other storage device is a hard drive. Additionally, one or more of the storage devices 102, 202 can be located either entirely or partially external relative to the electronic device 100, and the server 200.

Figure 3:
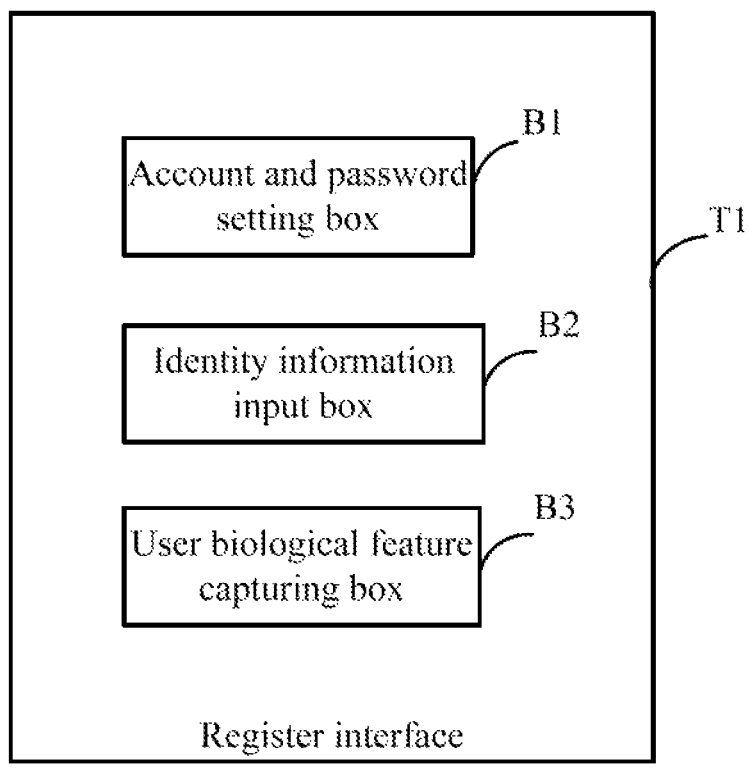
FIG. 3 is a block diagram of a register interface of one embodiment.

Referring also to FIG. 3, the register control module 11 is used to provide a register interface T1 in response to a register request for registering in one particular application installed in the electronic device 100. The register interface T1 at least includes an account and password setting box B1, an identity information input box B2, and a user biological feature capturing box B3. The account and password setting box B1 is provided for a user to set an account and a password which are used to log in to the particular application. The identity information input box B2 is provided for the user to input identity information of the user. In at least one embodiment, the identity information can be an identity card number. The user biological feature capturing box B3 is provided for the user to input a biological feature of the user, such as a fingerprint, a facial image, or sound of the user.

The register control module 11 is further used to receive the account and password input via the account and password setting box B1, the identity information input via the identify information input box B2, and the biological feature input via the user biological feature capturing box B3. The register control module 11 further associates the received account and password with the identity information and the biological feature to generate register information, and store the register information to the storage device 202 of the server 200, thus completing the registration of the user. The register information includes the account and password, the identity information, and the biological feature associated with each user. In the embodiment, the user of the electronic device 100 can download a particular application and install the particular application on the electronic device 100, and can generate the register request via clicking a register option of an interface of the particular application.

In at least one embodiment, the register control module 11 receives the biological feature input via the user biological feature capturing box B3 as follows: the register control module 11 starts up the biological feature capturing unit 103 to capture the biological feature of the user in response to a selection on the user biological feature capturing box B3 by the user, and receives the biological feature of the user captured by the biological feature capturing unit 103. In at least one embodiment, the biological feature capturing unit 103 can include at least one of a fingerprint reader, a camera, and a microphone, which are respectively used to capture the fingerprint, facial image, and sound of the user.

Figure 4:
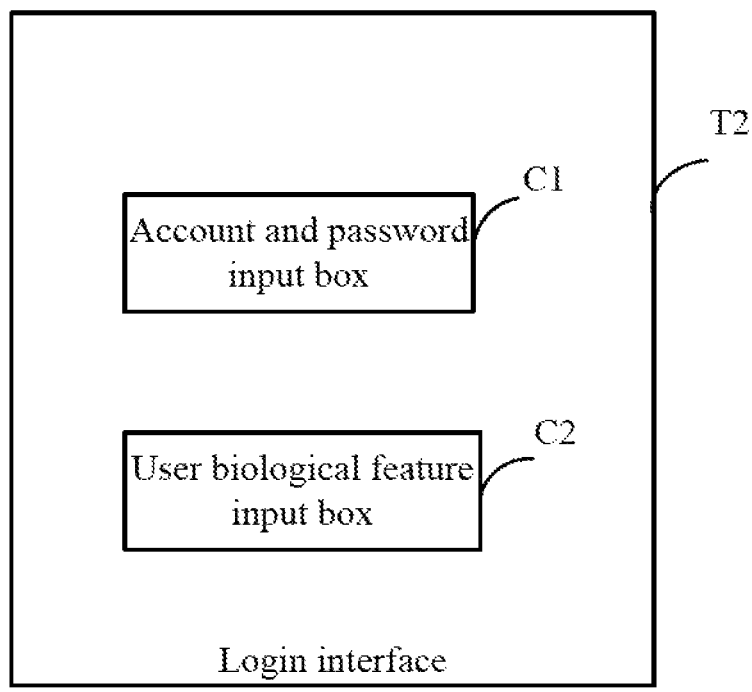
FIG. 4 is a block diagram of a login interface of one embodiment.

Referring also to FIG. 4, the login verification module 12 is used to provide a login interface T2 in response to a user login operation for logging in the particular application. The login interface T2 at least includes an account and password input box C1 and a user biological feature input box C2. The login verification module 12 is further used to receive the account and the password input via the account and password input box C1, and the biological feature input via the user biological feature input box C2, and compare the account, the password, and the biological feature with the register information stored in the storage device 202 of the server 200 to judge whether the user is valid and is permitted to log in. In detail, when the login verification module 12 determines that the account, the password, and the biological feature input via the login interface T2 match with that of one register information stored in the storage device 202, the login verification module 12 determines that the user is valid and permitted to log in. When the login verification module 12 determines that the account, the password, and the biological feature input via the login interface T2 do not match with any register information stored in the storage device 202, the login verification module 12 determines that the user is invalid and forbids the user to log in.

In at least one embodiment, the login verification module 12 receives the account and password input via the account and password input box C1 directly. The login verification module 12 receives the biological feature input via the user biological feature input box C2. In detail, the login verification module 12 starts up the biological feature capturing unit 103 to capture the biological feature of the user in response to a user selection on the user biological feature input box C2, and receives the biological feature of the user captured by the biological feature capturing unit 103.

In another embodiment, when the biological feature is a facial image or the sound, the user also can input the biological feature by selecting a digital photo including the face of the user or an audio file including the sound of the user from the storage device 102 of the electronic device 100.

The permission obtaining module 13 is used to determine an age of the user after the user is logged in, and determine a use permission for that user to use the particular application according to relationships between different age ranges and use permissions defined in a relationship table. That is, the relationship table defines relationships between different age ranges and different use permissions. The permission obtaining module 13 determines the age range which that user is within, and determines the use permission corresponding to the determined age range according to the relationship table. In at least one embodiment, the permission obtaining module 13 determines the age of the user according to the identity information of the user.

In at least one embodiment, each use permission includes an allowable time period each time the user logs in and/or a total allowable time period per day (also can be per week or per other period each time) the user logs in. For example, for an age range less than 14 years old, the allowable time length each time the user logs in is 1 hour, and the total allowable time period per day that the user logs in is 2 hours. For an age range from 14 to 18 years old, the allowable time period each time the user logs in is 2 hours and the total allowable time period per day that the user logs in is 4 hours. In at least one embodiment, the relationship table can be pre-established by an administrator of the particular application.

The permission management module 14 is used to generate a prompt signal to prompt the user to repeat the input of the biological feature at first predetermined intervals (such as every 30 minutes) after the user logs in successfully, and to determine whether or not the repeated biological feature is received within a first predetermined period (such as 10 seconds) after generating the prompt signal. If no biological feature is received within the first predetermined period, the permission management module 14 forbids the user to use the particular application.

The permission management module 14 is further used to determine whether the biological feature input by the user matches with a biological feature corresponding to the account that the user uses to log in to the particular application, when the input of the biological feature is repeated by the user within the second predetermined time. If yes, the permission management module 14 permits continued use of the particular application. If not, the permission management module 14 forbids the user to use the particular application. Therefore, when a valid user leaves the electronic device 100 and another user, such as a child, takes his place, the permission management module 14 prevents unauthorized use by the child of a particular application of the electronic device 100.

The permission management module 14 further starts to count time after the user logs in to the particular application, and determines whether the counted time reaches the allowable time period each time the user logs in. If the counted time reaches the allowable time period each time the user logs in, the permission management module 14 forbids the user to use the particular application. If the counted time does not reach the allowable time period each time the user logs in, the permission management module 14 permits continued use of the particular application.

The permission management module 14 further calculates a total time period per day the user logs in the particular application, and judges whether the total time period reaches the total allowable time period per day that the user logs in. If the total time period reaches the total allowable time period for a single day, namely reaches the total allowable time period per day that the user logs in, the permission management module 14 forbids the user to use the particular application. In detail, the permission management module 14 calculates the total time period each time when the user logs out of the particular application during a single day, and adds the calculated total time period together with the counted time currently logs in to obtain the current total time period in one day.

In the embodiment, the permission management module 14 forbids the user to use the particular application by controlling the account of the user to log out from the particular application or closing the application.

In at least one embodiment, the permission management module 14 further detects whether the electronic device 100 is locked at a second predetermined intervals(such as every 1 minute). If yes, namely that the electronic device 100 is locked, the permission management module 14 stops counting time, and does not resume counting time until the electronic device 100 is unlocked.

In the embodiment, when the login verification module 12 verifies that the user is valid and permitted, the login verification module 12 further determines whether a time duration from a previous logging out of the particular application by the user is greater than a second predetermined period (such as 1 hour). If not, namely, that the time duration from the previous logging out is not greater than the second predetermined period, the login verification module 12 forbids the user to log in.

In at least one embodiment, when the register control module 11 receives the account and password, the identity information, and the biological feature, the register control module 11 further can obtains an actual biological feature corresponding to the input identity information. For example, when the input identity information is the identity card number, the register control module 11 can obtain the facial image, the fingerprint, or the sound corresponding to the identity card number from an identity information database, thus obtaining the actual biological feature corresponding to the input identity information. The register control module 11 further determines whether the obtained actual biological feature matches with the biological feature input via the user biological feature capturing box B3. If yes, namely, if the actual biological feature matches with the biological feature input via the user biological feature capturing box B3, the register control module 11 permits the user to register. If not, the register control module 11 does not permit registration. Therefore, the present disclosure prevents fraudulent use, by children for example, in using another person's identity information, such as the stolen identity information of an adult, to register.

Figure 5:
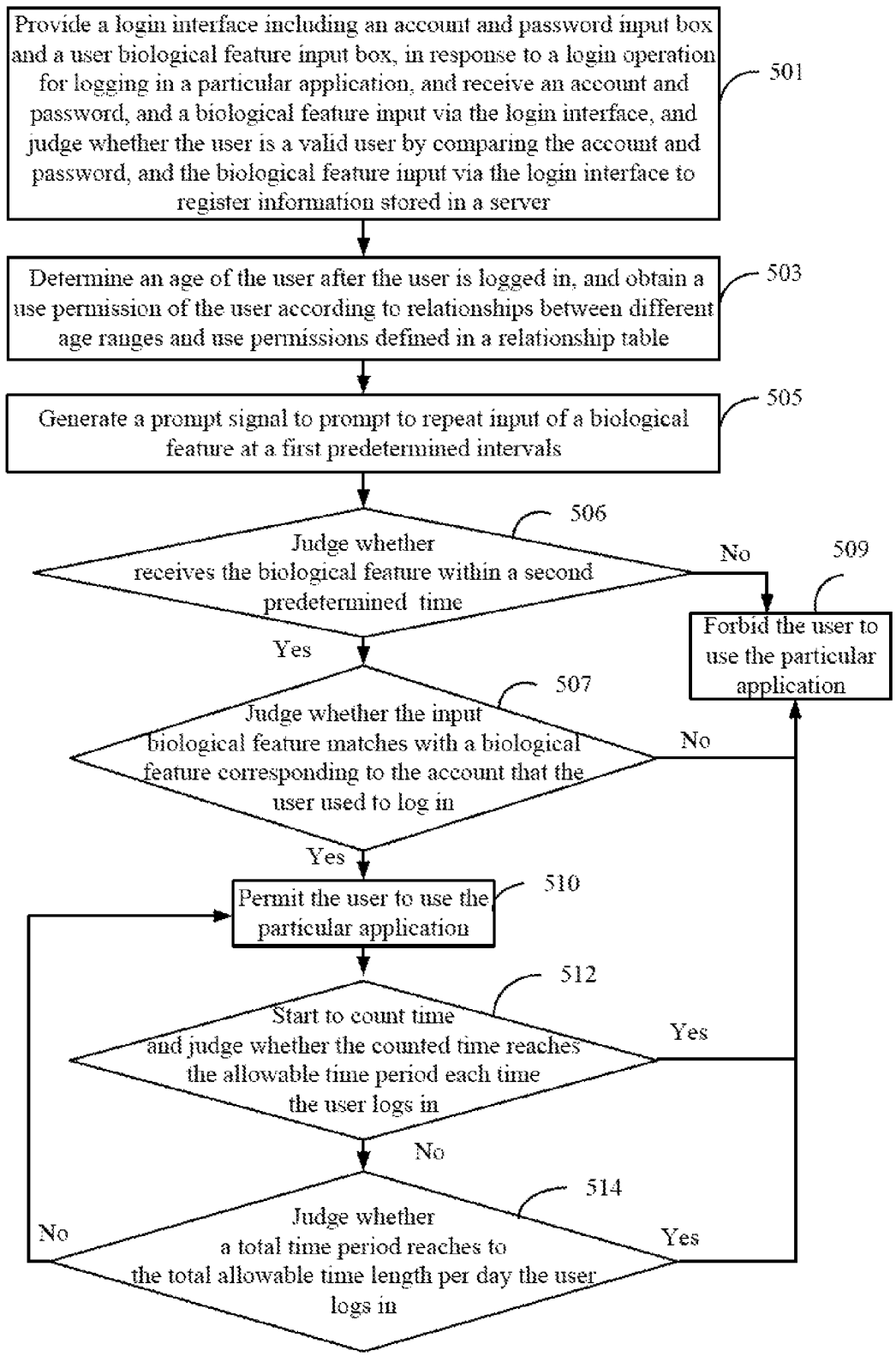
FIG. 5 is a flowchart illustrating an addiction-prevention method of one embodiment.

FIG. 5 illustrates a flowchart of an addiction-prevention method. The method is provided by way of example, as there are a variety of ways to carry out the method. The method described below can be carried out using the configurations illustrated in FIGS. 1 and 2, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, a login verification module provides a login interface at least including an account and password input box and a user biological feature input box, in response to a login operation for logging in a particular application, and receives an account and password input via the account and password input box and a biological feature input via the user biological feature input box, and compares the account, password, and the biological feature with the register information stored in a server to judge whether the user is valid and is permitted to log in. In detail, when the login verification module determines the account and password, and the biological feature input via the login interface match with that of one register information stored in the storage device, the login verification module judges the user is valid and is permitted to log in.

At block 503, a permission obtaining module determines an age of the user after the user is logged in according to the register information of the user, and obtains a use permission of the user according to relationships between different age ranges and use permissions defined in a relationship table. In the embodiment, the relationship table defines relationships between different age ranges and different use permissions, each use permission includes an allowable time period each time the user logs in and/or a total allowable time period per day that the user logs in.

At block 505, a permission management module generates a prompt signal to prompt the user repeat the input of the biological feature at first predetermined interval after the user logs in successfully.

At block 506, the permission management module determines whether or not the repeated biological feature is received within a first predetermined period after generating the prompt signal. If yes, the process goes to block 507, if not, the process goes to block 509.

At block 507, the permission management module judges whether the input biological feature matches with a biological feature corresponding to the account that the user used to log in the particular application. If not, the process goes to block 509, if yes, the process goes to block 510.

At block 509, the permission management module forbids the user to use the particular application.

At block 510, the permission management module permits continued use of the particular application.

At block 512, the permission management module starts to count time after the user logs in the particular application, and determines whether the counted time reaches the allowable time period each time the user logs in. If yes, the process goes to block 509, if not, the process goes to block 514.

At block 514, the permission management module calculates a total time period per day the user logs in the particular application, and judges whether the total time period reaches the total allowable time period per day that the user logs in. If yes, the process goes to block 509, if not, the process goes to block 510. In detail, the permission management module calculates the total time period each time when the user logs out of the particular application during a single day, and adds the calculated total time period together with the counted time currently logs in to obtain the current total time period in one day.

In at least one embodiment, the method further includes steps: the permission management module further detects whether the electronic device is locked at a second predetermined intervals, if yes, the permission management module stops counting time, and does not resume to count time until the electronic device is unlocked.

In at least one embodiment, the method further includes steps: when the login verification module verifies the user is the valid user, the login verification module further determines whether a time duration from a previous logging out of the particular application by the user is greater than a second predetermined period, if not, the login verification module forbids the user to log in.

In at least one embodiment, the method further includes steps: a register control module provides a register interface in response to a register request for registering in one particular application, the register interface at least includes an account and password setting box, an identity information input box, and a user biological feature capturing box; the register control module further receives the account and password input via the account and password setting box, the identity information input via the identity information input box, and the biological feature input via the user biological feature capturing box, and associates the received account and password with the identity information and the biological feature to generate register information, and store the register information to the storage device of the server to complete the registration of the user.

In at least one embodiment, the method further includes steps: when the register control module receives the account and password input via the account and password setting box, the identity information input via the identity information input box, and the biological feature input via the user biological feature capturing box, the register control module further obtains an actual biological feature corresponding to the input identity information; and judges whether the actual biological feature matches with the biological feature input via the user biological feature capturing box, if yes, the register control module permits the user to register, if not, the register control module does not permit registration.

Figure 6:
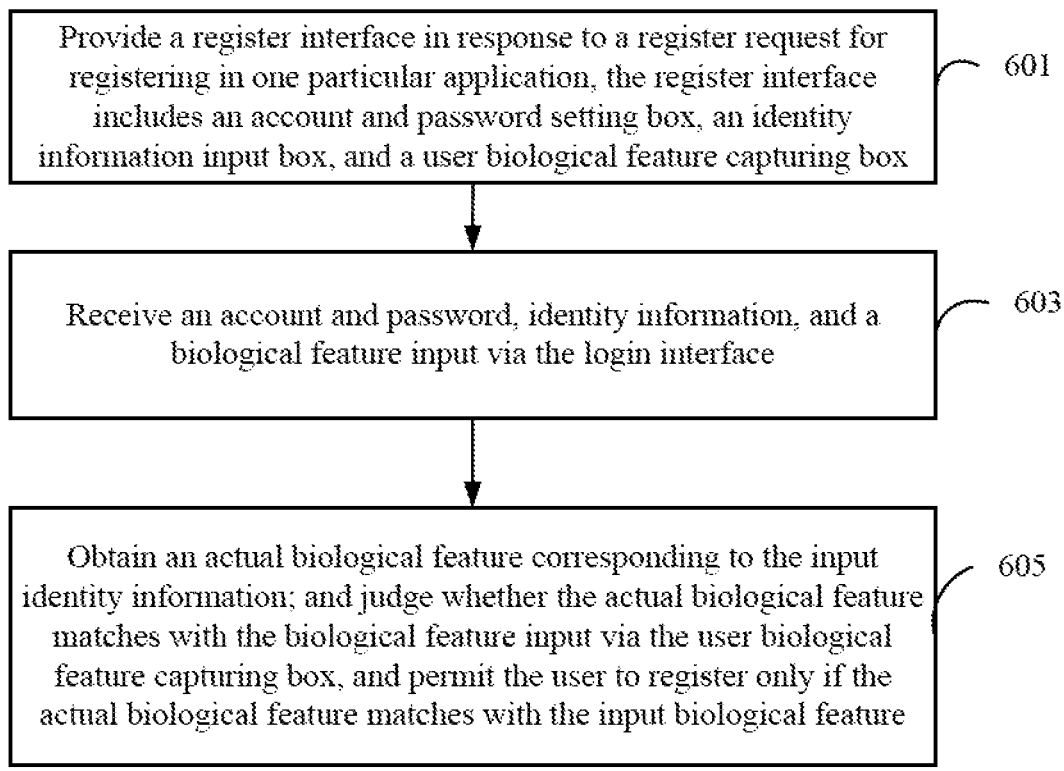
FIG. 6 is a flowchart illustrating a register management method of the addiction-prevention management method of FIG. 5.

FIG. 6 illustrates a flowchart of a registering method of the addiction-prevention management method of FIG. 5. The method is provided by way of example, as there are a variety of ways to carry out the method. The method described below can be carried out using the configurations illustrated in FIGS. 1 and 2, for example, and various elements of these figures are referenced in explaining the example method. Each block shown in FIG. 6 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 601.

At block 601, a register control module provides a register interface in response to a register request for registering in one particular application, the register interface at least includes an account and password setting box, an identity information input box, and a user biological feature capturing box.

At block 603, the register control module receives an account and password input via the account and password setting box, identity information input via the identity information input box, and a biological feature input via the user biological feature capturing box.

At block 605, the register control module obtains an actual biological feature corresponding to the input identity information; and judges whether the actual biological feature matches with the biological feature input via the user biological feature capturing box, if yes, the register control module permits the user to register, if not, the register control module forbids the user to register.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   a storage device storing a plurality of forbidden lists, and a plurality of modules which are collections of instructions;
   a biological feature capturing unit, configured to capture biological features of a user; and
   at least one processor configured to execute the plurality of modules, the plurality of modules comprising:
   a permission management module configured to, upon execution by the at least one processor, cause the at least one processor to generate a prompt signal to prompt a user to repeat input of a biological feature at a first predetermined intervals after the user logs in a particular application, and judge whether the biological feature input by the user matches with a biological feature corresponding to an account that the user uses to log in the particular application, and forbid the user to use the particular application if the biological feature input by the user is not matched with the biological feature corresponding to the account; and
   a login verification module configured to, upon execution by the at least one processor, cause the at least one processor to provide a login interface at least comprising an account and password input box and a user biological feature input box, in response to a login operation for logging in the particular application, and to receive an account and password input via the account and password input box and start up the biological feature capturing unit to capture the biological feature of the user and receive the biological feature captured by the biological feature capturing unit in response to an operation of selecting the user biological feature input box, and to judge whether the user is valid by comparing the account and password, and the first biological feature input via the login interface to an account and password, and a biological feature of each register information stored in a server.

2. The electronic device according to claim 1, wherein the permission management module is further configured to judge whether the repeated biological feature is received within a first predetermined period after generating the prompt signal, and forbid the user to use the particular application if no biological feature input by the user within the first predetermined period.

3. The electronic device according to claim 1, wherein the modules further comprises a permission obtaining module, the permission obtaining module is configured to, upon execution by the at least one processor, cause the at least one processor to determine an age of the user after the user is logged in, and obtain a use permission of the user according to relationships between different age ranges and use permissions defined in a relationship table, each use permission comprises an allowable time period each time the user logs in and a total allowable time period per day that the user logs in; the permission management module is further configured to start to count time after the user logs in the particular application, and judge whether the counted time reaches to the allowable time period each time the user logs in, and forbid the user to use the particular application if the counted time reaches to the allowable time period each time the user logs in.

4. The electronic device according to claim 3, wherein the permission management module is further configured to calculate a total time period per day the user logs in the particular application, and judges whether the total time period reaches the total allowable time period per day that the user logs in, and forbid the user to use the particular application if the total time period reaches to the total allowable time period per day that the user logs in.

5. The electronic device according to claim 4, wherein the permission management module is further configured to detect whether the electronic device is locked at a second predetermined intervals, and stop counting time if the electronic device is locked, and resume to time once the electronic device is unlocked.

6. An addiction-prevention method, comprising:
generating a prompt signal to prompt a user to repeat input of a biological feature at a first predetermined intervals after the user logs in a particular application;
judging whether the biological feature input by the user matches with a biological feature corresponding to an account that the user used to log in the particular application;
forbidding the user to use the particular application if the biological feature input by the user is not matched with the biological feature corresponding to the account;
providing a login interface at least comprising an account and password input box and a user biological feature input box, in response to a login operation for logging in the particular application; and
receiving an account and password input via the account and password input box, and a biological feature input via the user biological feature input box, and comparing the account and password, and the biological feature input via the login interface to an account and password, and a biological feature of each register information stored in a server to judge whether the user is a valid user.

7. The method according to claim 6, further comprising:
providing a register interface in response to a register request for registering in the particular application, wherein the register interface comprises an account and password setting box, an identity information input box, and a user biological feature capturing box, the account and password setting box is provided for the user to set the account and password which are used to log in the particular application, the identity information input box is provided for the user to input identity information of the user, and the user biological feature capturing box is provided for the user to input the biological feature of the user; and
receiving the account and password input via the account and password setting box, the identity information input via the identity information input box, and the biological feature input via the user biological feature capturing box, and associating the received account and password with the identity information and the biological feature to generate the register information, and store the register information to the server.

8. The method according to claim 6, further comprising:
obtaining an actual biological feature corresponding to the input identity information when receiving the account and password, the identity information, and the biological feature input via the register interface;
judging whether the actual biological feature matches with the biological feature input via the register interface;
permitting the user to register if the actual biological feature matches with the biological feature input via the register interface; and
forbidding the user to register if the actual biological feature does not matches with the biological feature input via the register interface.

9. The method according to claim 6, further comprising:
judging whether the repeated biological feature is received within a first predetermined period after generating the prompt signal; and
forbidding the user to use the particular application if no biological feature is received within the first predetermined time.

10. The method according to claim 9, further comprising:
determining an age of the user after the user is logged in, and obtaining a use permission of the user according to relationships between different age ranges and use permissions defined in a relationship table, wherein each use permission comprises an allowable time period each time the user logs in and a total allowable time period per day that the user logs in;
starting to count time after the user logs in the particular application;
judging whether the counted time reaches to the allowable time period each time the user logs in of the corresponding use permission; and
forbidding the user to use the particular application if the elapsed time reaches to the allowable time period each time the user logs in.

11. The method according to claim 10, further comprising:
calculating a total time period per day the user logs in the particular application;
judging whether the total time period reaches to the total allowable time period per day that the user logs in; and
forbidding the user to use the particular application if the total time period reaches to the total allowable time period per day that the user logs in.

12. A method for limiting use of an electronic device, comprising:
maintaining relationships between age categories and use permissions to the electronic device, each use permission including a maximum consecutive time access and maximum collective time access over a preset period;
receiving entry of login credentials to the electronic device, the login credentials including a biological feature;
determining use permission based on the age category corresponding to the received login credentials;
periodically prompting, during use of the device, entry of biological features;

locking out at least some first features of the electronic device in response to the biological feature of the receiving being inconsistent with the feature received in response to the prompting;

locking out at least some second features of the electronic device in response to the electronic device being in use the maximum consecutive time access; and locking out at least some third features of the electronic device in response to the electronic device being in use for the maximum collective time access over a preset period.

13. The method of claim 12, wherein the first, second and third features of the electronic device may be the same or different.

\* \* \* \* \*